United States Patent [19]
Glatt et al.

[11] 4,144,303
[45] Mar. 13, 1979

[54] METHOD AND APPARATUS FOR MOLDING A COMPOSITE PLASTIC ARTICLE

[75] Inventors: Jack E. Glatt, Barrington; Jacob J. Detzel, Richmond; Richard Lane, Streamwood, all of Ill.

[73] Assignee: Keolyn Plastics, Inc., Mount Prospect, Ill.

[21] Appl. No.: 828,680

[22] Filed: Aug. 29, 1977

[51] Int. Cl.² .................... B29D 3/00; B29F 1/00
[52] U.S. Cl. ............................ 264/138; 264/275; 264/328; 425/110; 425/129 R; 425/289
[58] Field of Search .............. 264/138, 259, 275, 278, 264/328, 163, 266; 425/110, 121, 129, 289, 112, 129 R; 156/261, 518

[56] References Cited
U.S. PATENT DOCUMENTS

| | | | |
|---|---|---|---|
| 3,122,598 | 2/1964 | Berger | 264/247 |
| 3,270,101 | 8/1966 | Jardine et al. | 264/275 |
| 3,272,681 | 9/1966 | Langecker | 264/98 |
| 3,463,845 | 8/1969 | De Pass et al. | 425/129 |
| 3,608,020 | 9/1971 | Langecker | 264/275 |
| 3,657,405 | 4/1972 | Langecker | 264/278 |
| 3,743,458 | 7/1973 | Hallauer et al. | 264/275 |
| 4,061,455 | 12/1977 | Von Holt | 425/289 |

OTHER PUBLICATIONS

Anon., "New Injection Modling Process . . . ", Plastics World, Apr. 1977, Canner's World, Boston, p. 75.

Primary Examiner—W. E. Hoag
Attorney, Agent, or Firm—Kinzer, Plyer, Dorn & McEachran

[57] ABSTRACT

A method and apparatus for molding a composite plastic article having a piece of plastic film fused to the outer surface of the plastic article at a location away from the main parting line of the mold in which the plastic article is formed.

3 Claims, 3 Drawing Figures

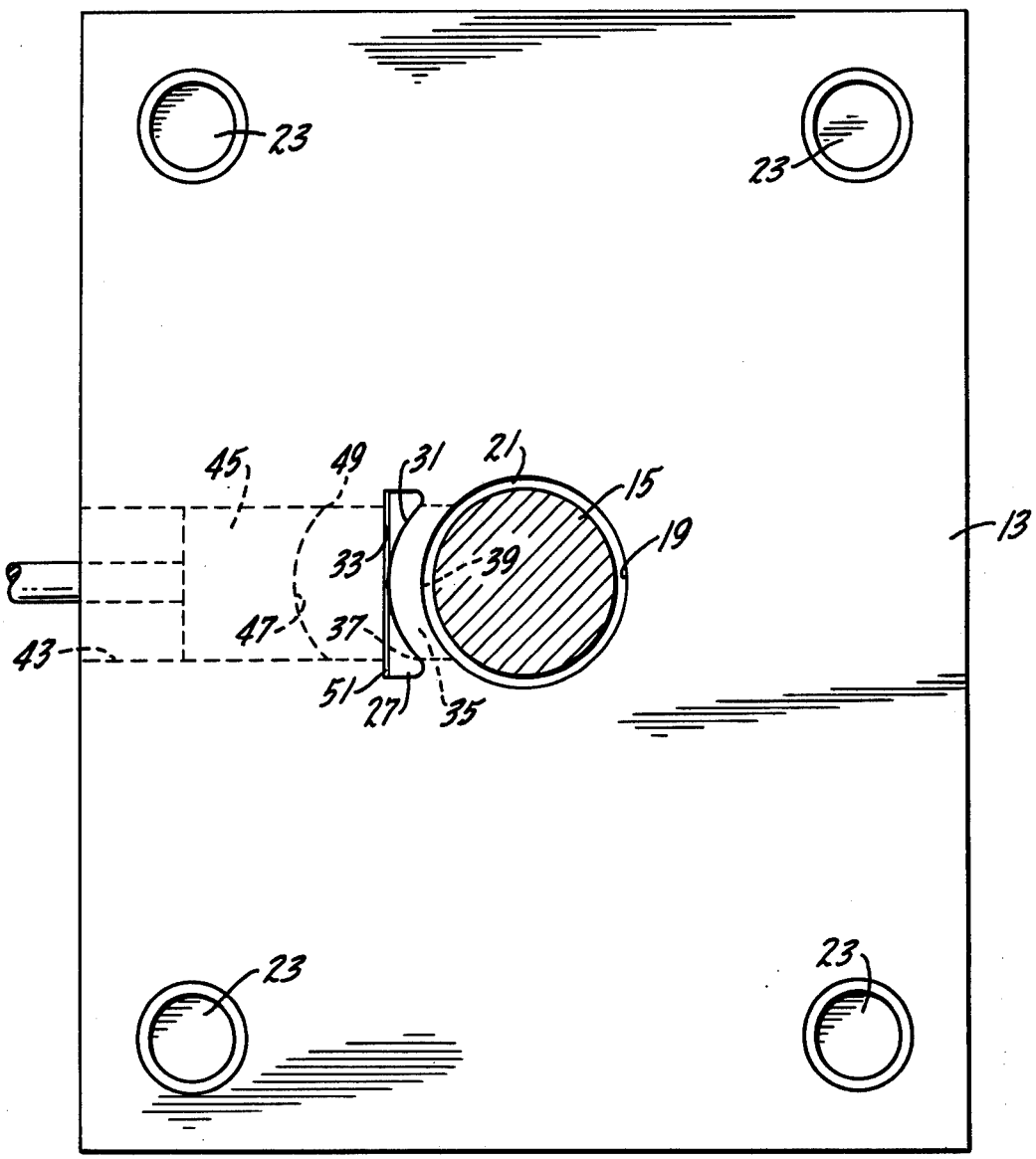
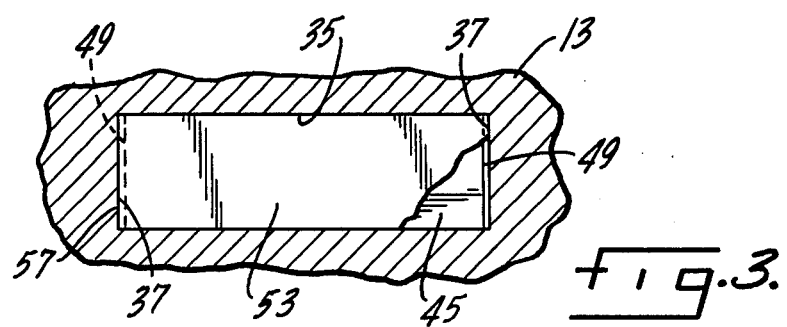

METHOD AND APPARATUS FOR MOLDING A COMPOSITE PLASTIC ARTICLE

BACKGROUND OF THE INVENTION

Attempts have been made in the past to mold composite plastic articles having a plastic film fused or otherwise adhered to an outer surface of the plastic article. The adhered film was applied for decorative purposes or to provide indicia receiving or indicating surfaces on the composite plastic part. For example, U.S. Pat. No. 3,743,458 to Hallauer et al shows a method of decorating plastic articles formed by injection molding in which a foil bearing markings in the nature of ornamentation or inscription is united with the plastic article. However, the film used in the method described in the Hallauer et al patent can only be applied along the main parting line of the mold and only across the entire surface of the article which is positioned along the main parting line. Further, as can be seen in FIG. 3 of this patent, the piece of film which is fused to the injected molded plastic article is not embedded in the molten plastic because the edges of the piece of film are located entirely outside of the molten plastic article. The lack of embedding of the edges renders the attached strip of film more easily removable from the molten plastic article.

Another attempt is shown in U.S. Pat. No. 3,801,244 to Eisenberg. In the Eisenberg patent, the adhesive coated film 12 is applied along the main parting line of the mold and covers one entire surface of the molded product 48.

Another process for molding a multi-colored or multi-material part in one step is described in an article in Plastics World magazine, April 1977 edition, published by Cahners Publishing Co., Inc., 221 Columbus Avenue, Boston, Mass. 02116. The article, at page 75 of the magazine, describes an injected molded process in which a plastic film is encapsulated in an injected molded product. However, the film can only be inserted along the main parting line of the mold and the edges of the plastic film are completely encapsulated in the molten plastic article.

SUMMARY OF THE INVENTION

The invention is directed to a method and apparatus for molding a composite plastic article having a piece of plastic film fused to the outer surface of the plastic article at a location away from the main parting line of the mold.

An object of this invention is to provide a composite plastic article with a piece of plastic film fused thereto at a location other than along the main parting line of the mold.

Another object is to fuse a piece of plastic film to the outer surface of the plastic article which film covers less than the entire side of the molded object.

Another object is a composite non planar plastic article having a piece of film fused to the outer surface of a curved portion of the composite plastic article.

Another object is a molded composite plastic article having a piece of plastic film partially embedded in the outer surface of the plastic article.

Other objects may be found in the following specifications, claims and drawings.

BRIEF DESCRIPTION OF THE DRAWINGS

The invention is illustrated more or less diagrammatically in the following drawings wherein:

FIG. 2 is a top plan view of one of the mold members of FIG. 1; and

FIG. 3 is an enlarged view of a portion of FIG. 2 partially in cross-section and with parts broken away.

DESCRIPTION OF THE PREFERRED EMBODIMENT

Figure 1:
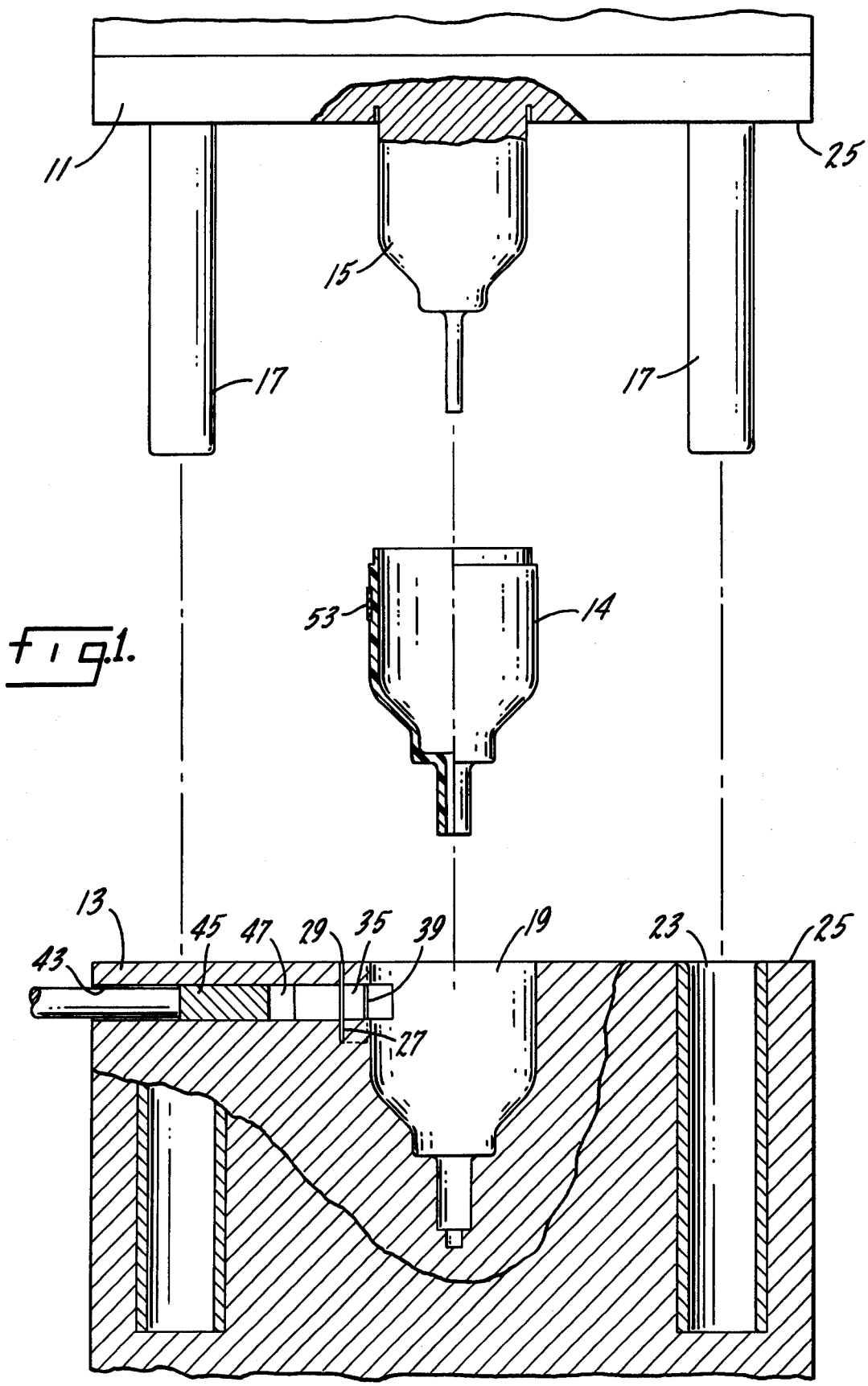
FIG. 1 is a side elevational view of a mold in its open position with portions broken away for clarity of illustration and including a molded composite plastic part partially in cross-section.

The drawings illustrate mold members 11 and 13 which are specifically designed for injection molding of a funnel like object 14. Only the mold members are illustrated since the mold members may be employed with well known injecting molding apparatus. It should be understood that the shape of the molding cavity produced by the mold members may be varied to produce theremoplastic objects of practically any desired configuration in accordance with the teachings of this invention.

Mold member 11 includes a core element 15 and guide pins 17. The core element 15 is received in a bore 19 formed in the mold member 13 and together define a cavity 21 shown in FIG. 3. The guide pins 17 are received in guide hole 23 formed in the mold member 13. Mold members 11 and 13 come together and separate along a parting line 25.

A film chamber 27 is formed in the mold member 13 adjacent the bore 19 and is accessible through an opening 29 formed in the mold member 13. The film chamber includes an arcuate wall 31 adjacent the core 15 and a straight wall 33 located on the opposite side thereof. A passage 35 leads from the film chamber and into the cavity 21. The edges 37 of this passage adjacent the film chamber form cutting edges. The passage 35 is rectangular in shape and is smaller in cross sectional dimensions than the chamber 27. The intersection of the passage 35 with the bore 19 forms an auxiliary opening 39 into the mold cavity 21.

A second passage 43 extends from the film chamber 27 to the exterior of the mold member 13. The passage 43 is aligned with the passage 35. An auxiliary closing member 45 is reciprocally mounted in the passage 35 for movement through the chamber 27 and into and through the passage 35 to close the auxiliary opening 39 into the cavity 21. The auxiliary closing member has an arcuate surface 47 facing the bore 19 which surface is complementary in shape to the inner surface of the bore 19 and also to the arcuate wall 31 of the film chamber 27. The outer edges 49 of the arcuate surface 47 are shaped to function as cutters. The cutting area defined by the edges 49 of the auxiliary closing member 45 is slightly smaller than the cutting area defined by the edges 37 of the passage 35. The cutting area so defined may be made smaller only by shortening the lengthwise cutting edges as illustrated in FIG. 3 or the cutting edges may be shortened on all four sides, but this is not shown.

The auxiliary closing member 45 can be reciprocated between a first position located outwardly of the film chamber 27 to a second position in which it closes the auxiliary opening 39 into the cavity 21. It may be reciprocated by any conventional mechanism, but this mechanism is not shown for clarity of illustration.

In use, a strip of film 51 having dimensions larger than the dimensions defined by the cutting edges 37 of the passage 35 is inserted in the film chamber 27 when the mold members 11 and 13 are separated. The film may be any thermoplastic film which is compatible with the molten plastic to be injected into the cavity 21. The degree of compatibility between the film and the molten plastic need not be absolute because the film can be slightly embedded or encapsulated into the molten plastic in accordance with the teachings of this invention. However, if the film used is completely compatible with the plastic, with the term compatibility being defined as having the same chemical characteristics, shrinkage rate, bonding ability, etc., it may not be necessary to embed or encapsulate the film in the molten plastic.

After the strip of film 51 is inserted into the film chamber 27, the mold members 11 and 13 are closed along the parting line 25 thereby forming the cavity 21 defined by the core 15 and bore 19 of the respective mold members. The auxiliary closing member 45 is then moved from a position outwardly of the film chamber 27 into the chamber where its cutting edges 49 engage the strip of film 51 and move the strip into contact with the cutting edges 37 of the passage 35 leading from the chamber to the auxiliary opening 39 into the mold cavity 21. Continued inward movement of the auxiliary closing member will cause the cutting edges 49 of the closing member to cooperate with the cutting edges 37 of the passage to cut a piece of film 53 from the strip of film 51. Since the perimeter defined by the edges 37 is greater than the perimeter of the cutting edges 49 at least on some edges of the closing member 45, the piece of film 53 will have burrs or slight projections formed around its edges which will be trapped between the auxiliary closing member and the walls of the passage 35. These burrs or tabs will securely retain the piece of film on the auxiliary closing member as the auxiliary closing member moves the piece of film to the auxiliary opening 39 of the cavity 21.

Depending on the type of film and its compatibility relative to the molten plastic, the piece of film 53 may be moved part way inwardly of the inner wall of the bore 19 so that the edges 57 of the piece of film will be at least partially contacted by the injected molten plastic. The amount of projection of the edges 57 of the piece of film 53 into the mold cavity 21 will be determined by the compatibility of the film and the rate of shrinkage of the molten plastic. Too great a projection of the piece of film beyond the outer surface of the molded product 14 may interfere with the removal of the molded product from the mold member.

Also, too great a projection of the piece of film into the mold cavity may result in displacement of the piece of film from its designated position by the flow of the injected molten plastic material into the cavity 21. When the piece of film supported by the auxiliary closing member 45 is properly positioned in the auxiliary opening to the mold cavity, the molten plastic may be injected into the cavity 21 thereby bonding the piece of film 53 to the molten plastic material. When the molten plastic has cooled sufficiently, the auxiliary closing member 45 is retracted to its position outwardly of the film chamber 27 and the mold member 11 and 13 are separated for removal of the molded part 14 and beginning of another cycle of operation.

We claim:

1. A method of molding a composite plastic article in which a piece of plastic film is fused to the outer surface of the plastic article at a location away from the main parting line of the mold, said method including the steps of:
    closing a pair of mold members along a main parting line to establish a mold cavity,
    providing an auxiliary opening into the mold cavity through one of the mold members at a location away from the main parting line,
    providing a separate closing member for the mold cavity auxiliary opening with the closing member having cutting edges around the perimeter thereof,
    positioning a strip of plastic film with dimensions greater than those defined by the cutting edges of the auxiliary closing member between the auxiliary closing member and the auxiliary opening of the mold cavity,
    moving said auxiliary closing member through said strip of film and into a die to sever a piece of film from said strip,
    carrying said severed piece of film on said auxiliary closing member to said mold cavity auxiliary opening to position said piece of film at least partially into the mold cavity and to close the auxiliary opening,
    holding the severed piece of film on said auxiliary closing member only by catching projecting portions of said film between the auxiliary closing member and walls defining said auxiliary opening through which said auxiliary closing member passes, and
    injecting molten plastic into said mold cavity while supporting said piece of film in said auxiliary opening until said piece of film is fused to said molten plastic.

2. The method of claim 1 in which the edge surfaces of the severed piece of plastic film are positioned in the auxiliary opening to project at least partially inwardly of the inner surface of the mold cavity so that the piece of film will be at least partially embedded in the finish molded plastic article.

3. Apparatus for molding a composite plastic article in which a piece of plastic film is fused to the outer surface of the plastic article at a location away from the main parting line of the mold, said apparatus including:
    a pair of mold members movable into engagement with each other to form a mold cavity having a main parting line,
    an auxiliary opening into said mold cavity formed in one of said mold members at a location away from the main parting line,
    a separate closing member for the mold cavity auxiliary opening with the separate closing member having cutting edges around the periphery thereof,
    means for positioning a strip of plastic film between the auxiliary closing member and the auxiliary opening into the mold cavity,
    said strip of plastic film having dimensions greater than those defined by the cutting edges of said auxiliary closing member,
    a die positioned between said auxiliary closing member and said auxiliary opening into the mold cavity, said die having cutting edges which cooperate with the cutting edges for the auxiliary closing member,
    means to bring said auxiliary closing member, said strip of film and said die together to sever a piece of film from said strip and to carry said severed piece of film to said mold cavity auxiliary opening to thereby position said piece of film at least partially into the mold cavity and close the auxiliary opening, ad means to inject molten plastic into said mold cavity while supporting said piece of film in said auxiliary opening until said piece of film is fused to said molten plastic, said separate closing member being adapted by a difference between at least one dimension of said cutting edges and a dimension of a corresponding portion of said auxiliary opening to form projecting portions on the severed piece of film and to hold the severed piece of film on the auxiliary closing member during injection of molten plastic only by reason of said difference.

* * * * *